(12) United States Patent
Quinnell

(10) Patent No.: US 10,564,963 B2
(45) Date of Patent: *Feb. 18, 2020

(54) BIT-MASKED VARIABLE-PRECISION BARREL SHIFTER

(71) Applicant: Samsung Electronics Co., Ltd., Suwon-si, Gyeonggi-do (KR)

(72) Inventor: Eric C. Quinnell, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,873

(22) Filed: Feb. 21, 2018

(65) Prior Publication Data

US 2018/0181392 A1 Jun. 28, 2018

Related U.S. Application Data

(63) Continuation of application No. 14/856,538, filed on Sep. 16, 2015, now Pat. No. 9,904,545.

(60) Provisional application No. 62/189,183, filed on Jul. 6, 2015.

(51) Int. Cl.
*G06F 9/30* (2018.01)

(52) U.S. Cl.
CPC ...... *G06F 9/30014* (2013.01); *G06F 9/30036* (2013.01)

(58) Field of Classification Search
None
See application file for complete search history.

(56) References Cited

U.S. PATENT DOCUMENTS

| 4,139,899 | A | 2/1979 | Tulpule et al. |
| 4,653,019 | A | 3/1987 | Hodge et al. |
| 4,829,460 | A | 5/1989 | Ito |
| 5,652,718 | A | 7/1997 | Thomson et al. |
| 5,995,579 | A | 11/1999 | Vatinel |
| 6,308,189 | B1 | 10/2001 | Nguyen |
| 6,327,651 | B1 | 12/2001 | Dubey et al. |
| 6,343,337 | B1 | 1/2002 | Dubey et al. |
| 6,411,980 | B2 | 6/2002 | Yoshida |
| 7,461,109 | B2 | 12/2008 | Lin et al. |
| 8,082,526 | B2 | 12/2011 | Hutton et al. |
| 8,707,123 | B2 | 4/2014 | Liu et al. |
| 2003/0005269 | A1 | 1/2003 | Conner et al. |
| 2007/0088772 | A1 | 4/2007 | Nunes et al. |
| 2008/0307204 | A1 | 12/2008 | Tam |
| 2011/0185151 | A1 | 7/2011 | Whitaker et al. |
| 2013/0060828 | A1 | 3/2013 | Hilker |

*Primary Examiner* — Corey S Faherty
(74) *Attorney, Agent, or Firm* — Renaissance IP Law Group LLP

(57) ABSTRACT

According to one general aspect, an apparatus may include a monolithic shifter configured to receive a plurality of bytes of data, and, for each byte of data, a number of bits to shift the respective byte of data, wherein the number of bits for each byte of data need not be the same as for any other byte of data. The monolithic shifter may be configured to shift each byte of data by the respective number of bits. The apparatus may include a mask generator configured to compute a mask for each byte of data, wherein each mask indicates which bits, if any, are to be prevented from being polluted by a neighboring shifted byte of data. The apparatus may include a masking circuit configured to combine the shifted byte of data with a respective mask to create an unpolluted shifted byte of data.

20 Claims, 8 Drawing Sheets

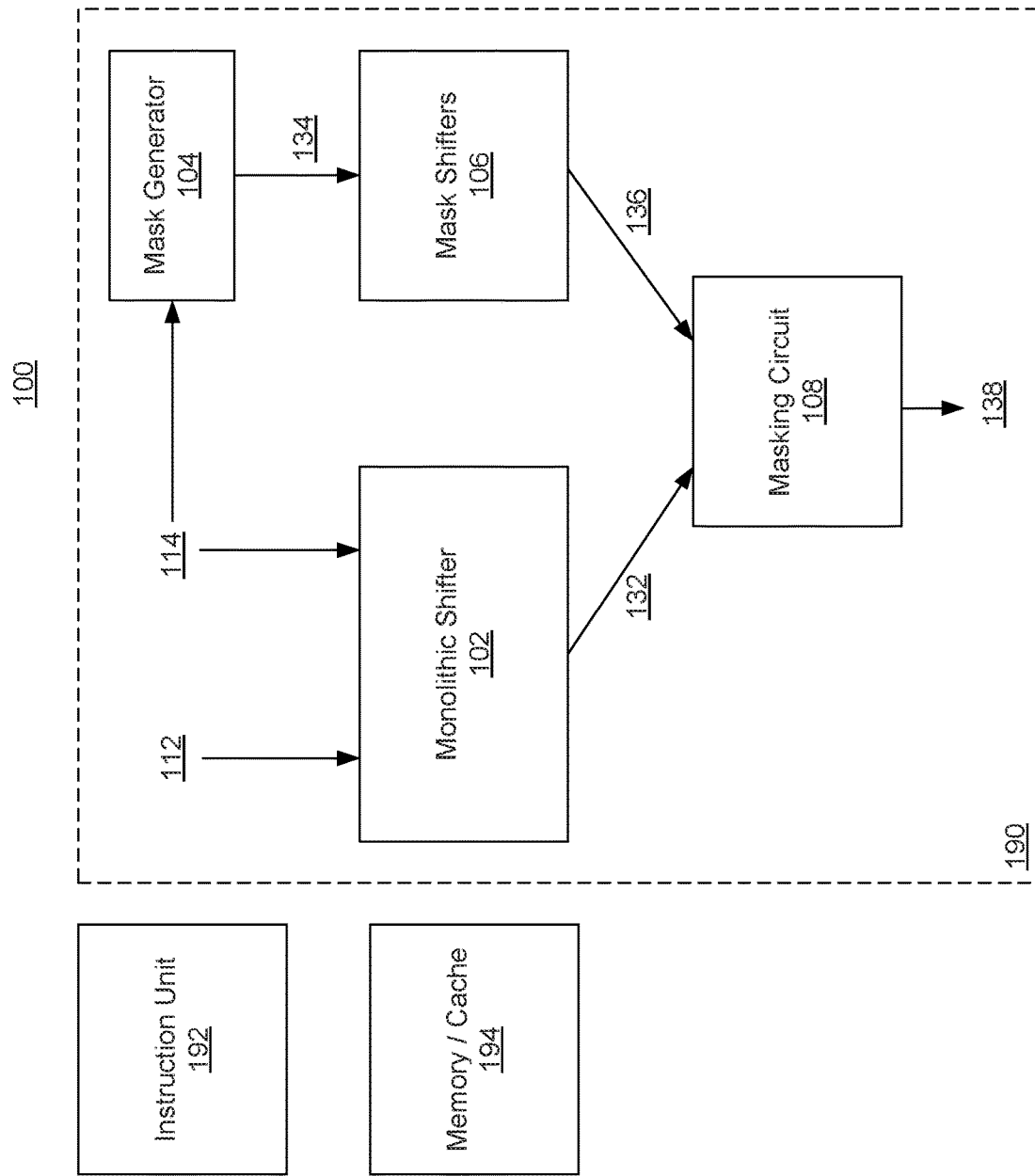

FIG. 2

| 208-7 | 208-6 | 208-5 | 208-4 | 208-3 | 208-2 | 208-1 | 208-0 |
|---|---|---|---|---|---|---|---|
| 204-3 | | 204-2 | | 204-1 | | 204-0 | |
| 202-1 | | | | 202-0 | | | |
| 200 | | | | | | | |

BIT-MASKED VARIABLE-PRECISION BARREL SHIFTER

CROSS-REFERENCE TO RELATED APPLICATION

This application is a continuation of U.S. patent application Ser. No. 14/856,538, filed Sep. 16, 2015, which claims the benefit of U.S. Patent Application Ser. No. 62/189,183, filed Jul. 6, 2015, which is hereby incorporated by reference.

TECHNICAL FIELD

This description relates to computer processing hardware, and more specifically to vector computing.

BACKGROUND

Single instruction, multiple data (SIMD) is a class of computing instructions in which multiple processing elements perform the same operation on multiple data points simultaneously. Such instructions exploit data level parallelism. SIMD instructions cause the computer to perform simultaneous (parallel) computations, with only a single instruction. SIMD instructions are often employed for common multimedia tasks, such as, for example, adjusting the contrast in a digital image, adjusting the volume of digital audio, etc.

SIMD instructions frequently make use of data that is packed into a vector. Vector integer, variable precision barrel shifters are often an important part of floating-point unit (FPU) SIMD execution data paths. Barrel shifters often perform SIMD parallel shifting to support high-performance implementations of shift instructions found in instruction set architectures (ISAs).

SUMMARY

According to one general aspect, an apparatus may include a monolithic shifter configured to receive, as input, a plurality of bytes of data. The monolithic shifter may also be configured to receive for each byte of data, as a dynamically adjustable input, a number of bits to shift the respective byte of data, wherein the number of bits for each byte of data need not be the same as for any other byte of data. The monolithic shifter may further be configured to shift, in parallel, each byte of data by the respective number of bits to create a shifted byte of data. The apparatus may include a mask generator configured to compute a mask for each byte of data, wherein each mask indicates which bits, if any, are to be prevented from being polluted by a neighboring shifted byte of data. The apparatus may include a mask shifter configured to, for each mask, create a shifted mask by shifting each mask according to the number of bits associated with each mask's respective byte of data. The apparatus may include a masking circuit configured to, for each shifted byte of data, combine the shifted byte of data with a respective shifted mask to create an unpolluted shifted byte of data.

According to another general aspect, a method may include receiving a plurality of portions of data, and, for each portion of data, an amount to shift the respective portion of data, wherein the amount to shift a respective portion of data need not be the same as an amount to shift any other portion of data. The method may include shifting, in parallel, each portion of data by the amount to shift of the respective portion of data. The method may further include generating, for each portion of data, a mask configured to prevent the respective portion of data from being undesirably polluted by a neighboring portion of data. The method may also include combining, for each portion of data, the respective shifted portion of data and the respective mask.

According to another general aspect, a system-on-a-chip (SoC) may include an instruction unit configured to issue an instruction comprising an indication of a plurality of portions of data to shift, and a shift amount value that indicates, for each portion of data a number of bits to shift the respective portion of data, wherein the number of bits to shift a portion of data need not be the same as for any other portion of data. The SoC may include a cache configured to store a plurality of portions of data. The SoC may include a processor or execution unit. The execution unit may include a monolithic shifter configured to shift, in parallel, each portion of data by the respective number of bits of shift to create a shifted portion of data. The execution unit may include a mask generator configured to compute a mask for each portion of data, wherein each mask indicates which bits, if any, are to be prevented from being polluted by a neighboring shifted portion of data. The execution unit may include a masking circuit configured to, for each shifted portion of data, combine the shifted portion of data with a respective mask to create an unpolluted shifted portion of data.

The details of one or more implementations are set forth in the accompanying drawings and the description below. Other features will be apparent from the description and drawings, and from the claims.

A system and/or method for computer processing hardware, and more specifically to vector computing, substantially as shown in and/or described in connection with at least one of the figures, as set forth more completely in the claims.

BRIEF DESCRIPTION OF THE DRAWINGS

FIG. 1a is a block diagram of an example embodiment of a system in accordance with the disclosed subject matter.

FIG. 2 is a block diagram of an example embodiment of a data structure in accordance with the disclosed subject matter.

Like reference symbols in the various drawings indicate like elements.

DETAILED DESCRIPTION

Figure 1B:
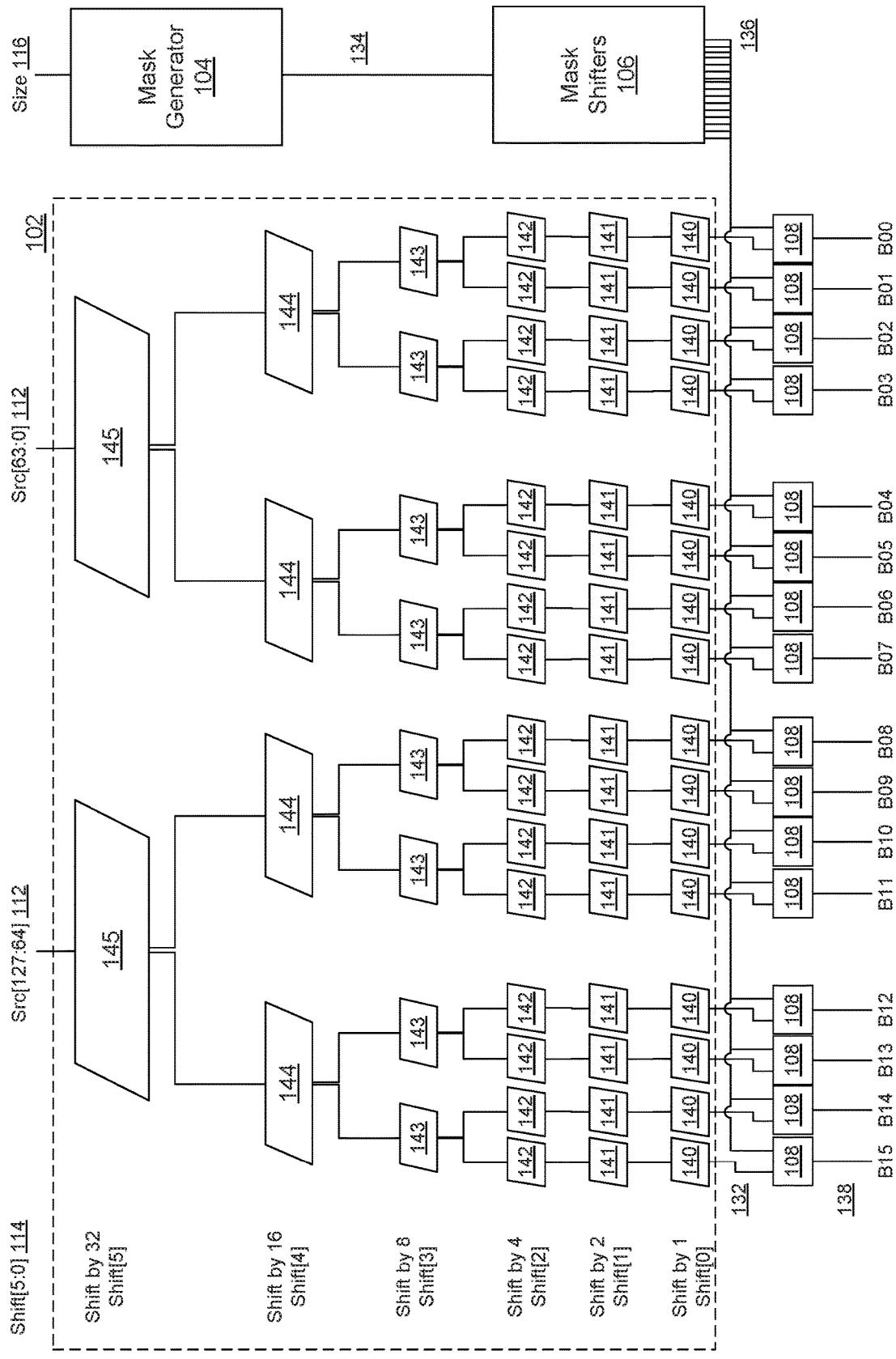
FIG. 1b is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1a is a block diagram of an example embodiment of a system 100 in accordance with the disclosed subject matter. In various embodiments, the system 100 may be configured to shift a vector of data elements (e.g., bytes, etc.) in such a way that neighboring elements do not pollute one another during the shifting process. Moreover, the system 100 is configured to be able to shift each data element by a different or variable amount.

In various embodiments, the system may include a processor, or in a specific embodiment a SIMD or floating point unit (FPU) 190. In the illustrated embodiment, the system 100 may also include an instruction unit 192 configured to issue instructions to various execution units (e.g., the FPU 190, etc.). In the illustrated embodiment, the system 100 may also include a memory, register file, local storage, or cache 194 configured to store data.

In such an embodiment, the instruction unit 192 may issue a SIMD instruction to the FPU 190. In various embodiments, the SIMD instruction may include a plurality of data 112 (e.g., in bytes, etc.) that are to be shifted by the FPU 190. In some embodiments, the SIMD instruction may include a plurality of bits or operands 114 that further instruct the FPU 190 how to shift the data 112. In various embodiments, the plurality of data 112 may be stored and sent to the FPU 190 from the cache 194. In the illustrated embodiment, the specific operation of the FPU 190 is described below.

In various embodiments, the system 100 may include a monolithic shifter circuit 102. In such an embodiment, the monolithic shifter 102 may be configured to receive, as input, a plurality of bytes of data or a vector 112. The monolithic shifter 102 may be configured to shift each byte of data 112 by a certain number of bits. The monolithic shifter 102 may be configured to output the shifted data 132.

In the illustrated embodiment, the monolithic shifter 102 may be configured to shift each byte of data 112 by a different amount. That is to say, a first byte may be shifted by 3-bits, a second byte may be shifted by 5-bits, and a third byte may be shifted by 7-bits, etc.

Traditionally, a shifter is configured to shift all bytes by a similar or same amount (e.g., shifting all bytes by 5-bits).

In the illustrated embodiment, the monolithic shifter 102 may include a single shifter that is employed for the shifting of all bytes of data 112. In such an embodiment, the monolithic shifter 102 may perform the shifting operation in parallel for each shifted byte 112. In one embodiment, this is illustrated in more detail in reference to FIG. 1b.

In various embodiments, the monolithic shifter 102 may receive, as input, a shift amount signal 114 that indicates, for each byte of data 112, a number of bits to shift the respective byte of data 112. In such an embodiment, the monolithic shifter 102 may be configured to shift each byte of data 112 according to the shift amount indicated by the respective portion of the shift amount signal 114.

Traditionally, when a byte (or another data portion, e.g., a word, etc.) that is packed together with other bytes or vectorized is shifted, the output is expected to be the same as if the byte was shifted in isolation. For example, as bits are shifted out of the byte, it is expected that 0s will be shifted into the bit.

However, because in SIMD instructions the bytes (or other data portion) are packed or vectorized together, as bits are shifted out from a first byte, bits from a second, neighboring byte may be shifted into the first byte. In such an embodiment, the output of the shifting operation may not be same as if the byte was shifted in isolation. In such an embodiment, bits from the neighboring byte may pollute the result of the shift of the first byte. This "pollution" may be undesirable.

In the illustrated embodiment, the monolithic shifter 102 may be configured to shift variably sized chucks or groups of data (e.g., bytes, half-words, words, double words, etc.). In such an embodiment, the monolithic shifter 102 may be configured to dynamically allow neighboring bytes to shift or not shift into each other, as dictated by the data size being shifted.

FIG. 2 is a block diagram of an example embodiment of a data structure 200 in accordance with the disclosed subject matter. In various embodiments, the data (e.g., data 112 of FIG. 1*a*) may include a double word 200 or 64-bits. As described above, in various embodiments, the shifter may be configured to shift the data in groupings or portions of variable size.

In the illustrated embodiment, the double word 200 may include two words 202-0 and 202-1 (32-bits); or four half-words 204-0, 204-1, 204-2, and 204-3 (16-bits); or eight bytes 208-0, 208-1, 208-2, 208-3, 208-4, 208-5, 208-6, 208-7, and 208-8 (8-bits). In various embodiments, other data sizes may be used. It is understood that the above is merely one illustrative example to which the disclosed subject matter is not limited.

In such an embodiment, if the system 100 of FIG. 1*a* is instructed to shift data based on half word boundaries, the data or bits from byte 208-6 may be allowed to shift into byte 208-7 (as bytes 208-7 and 208-6 are both part of the half-word 204-3). However, the system 100 may not allow the bits of byte 208-5 to pollute or shift into byte 208-6 (as bytes 208-5 and 208-6 are part of different half-words 204-3 and 204-2).

In another embodiment, the system 100 may be instructed to shift data based on word boundaries. In such an embodiment, the system 100 may allow the bits of byte 208-5 to shift into byte 208-6 (as bytes 208-5 and 208-6 are part of the same words 202-1). However, the system 100 may prevent the bits of byte 208-3 from polluting or shifting into byte 208-4 (as bytes 208-4 and 208-3 are part of different words 201-1 and 202-0).

In yet another embodiment, the system 100 may be instructed to shift data based on byte boundaries. In such an embodiment, the system 100 may prevent the bits of any one byte from polluting or shifting into any other byte (e.g., byte 208-0 shifting into byte 208-1).

In some embodiments, the system 100 may be configured to shift a first portion at a first size or boundary, and then a second portion at a second size or boundary (and so on). For example, the system 100 may be instructed to shift bytes 208-7, 208-6, 208-5, and 208-4 as a single word (32-bits), and also be instructed to shift bytes 208-3, 208-2, 208-1, and 208-0 as individual bytes (8-bits). In such an embodiment, the system 100 may allow bits from byte 208-5 to shift into byte 208-4 (as they are both in the word 202-1), but may prevent bits from byte 208-2 from shifting into or polluting byte 208-3. It is understood that the above are merely a few illustrative examples to which the disclosed subject matter is not limited.

Returning to FIG. 1*a*, in the illustrated embodiment, the system 100 may be configured to employ masks 134 to prevent undesirable pollution of bits between neighboring bytes or data portions. In such an embodiment, each byte may be associated with a mask 134. After shifting the data 132, the mask 134 (in shifted form 136) may be applied to the shifted data 132 in order to remove or mask-out any undesirable pollution from the shifted data 132. In the illustrated embodiment, the mask 134 may allow the system 100 to perform zero insertions and sign-extending (SEXT) without fixed hardware insertion. It is understood that the above is merely one illustrative example to which the disclosed subject matter is not limited.

In the illustrated embodiment, the system 100 may include a mask generator 104 configured to compute a mask 134 for each byte of data 112. As described above, each mask 134 may indicate which bits, if any, are to be prevented from being polluted by a neighboring shifted byte of data 112.

In various embodiments, the system 100 may include a mask shifter 106. In such an embodiment, the mask shifter 106 may be configured to, for each mask 134, create a shifted mask 136 by shifting each mask 134 according to the number of bits 114 associated with each mask's respective byte of data 112.

In one embodiment, the system 100 may include a masking circuit 108. The masking circuit 108 may be configured to, for each shifted byte of data 132, combine the shifted byte of data 132 with a respective shifted mask 136. In such an embodiment, this may result in an unpolluted shifted byte of data 138.

FIG. 1*b* is a block diagram of an example embodiment of a system 101 in accordance with the disclosed subject matter. In the illustrated embodiment, the inner workings of one possible embodiment of the monolithic shifter 102 are shown. It is understood that the above is merely one illustrative example to which the disclosed subject matter is not limited.

In the illustrated embodiment, the system 101 may include a monolithic shifter 102, a mask generator 104, a mask shifter 106, and a masking circuit 108. In the illustrated embodiment, the system 101 may receive, as input, a plurality of data 112, a shift amount signal 114, and a size signal 116. In such an embodiment, the size signal 116 may indicate the size of the portion of data to be shifted (e.g., word, double-word, etc.).

In various embodiments, the size of the portion of data to be shifted may be inferred by the value of the shift amount signal 114. In another embodiment, each byte (or smallest data portion) of the data 112 may be associated with both a shift amount signal 114 and a element size signal 116. In such an embodiment, the element size signal 116 may be encoded. For example, if a system 101 is capable of shifting four different sizes of data (e.g., byte sized, half-word sized, word-sized, double word sized, etc.), each data byte's element size signal 116 may include 2-bits. In another embodiment, a bit-flag scheme may be employed. It is understood that the above are merely a few illustrative examples to which the disclosed subject matter is not limited.

In the illustrated embodiment, the monolithic shifter 102 may be is organized to shift or force higher-element or portion sizes first. In such an embodiment, the shifting process may then trickle down to lower element or portion sizes. In such an embodiment, the monolithic shifter 102 may be configured to allow smaller elements or portions (e.g., bytes, etc.) to shift different amounts per lane or portion. This is contrasted with the shifting of larger elements (e.g., words, etc.) that would require bits to travel across the lane or smaller-portion boundaries.

In the illustrated embodiment, the system 101 may be configured to take as input a 128-bit quad-word, shown as Src[127:0] or data 112. The system 101 may be configured to operate on any variable data portions or boundaries between 64-bit double-words or 8-bit bytes. In such an embodiment, the shift amount signal 114 may include 6 bits, or allow for up to 63-bits of shift (i.e., one less bit than the maximum boundary amount). In various embodiments, the shift may occur to the left or the right. It is understood that the above is merely one illustrative example to which the disclosed subject matter is not limited.

In the illustrated embodiment, the monolithic shifter 102 may include two 32-bit or word-sized shifters 145 that are each configured to shift the data 112 by 32-bits. In such an embodiment, this shifter 145 may be controlled by the $5^{th}$ bit or most significant bit (MSB) of the 6-bit shift amount signal 114, wherein the shift amount signal 114 includes bits 5 through 0.

In the illustrated embodiment, the monolithic shifter 102 may include four 16-bit or half-word sized shifters 144 that are each configured to shift the data 112 by 16-bits. In such an embodiment, this shifter 144 may be controlled by the $4^{th}$ bit of the 6-bit shift amount signal 114.

In the illustrated embodiment, the monolithic shifter 102 may include eight 8-bit or byte sized shifters 143 that are each configured to shift the data 112 by 8-bits. In such an embodiment, this shifter 143 may be controlled by the $3^{rd}$ bit of the 6-bit shift amount signal 114.

In the illustrated embodiment, the monolithic shifter 102 may include sixteen 4-bit or nibble sized shifters 142 that are each configured to shift the data 112 by 4-bits. In such an embodiment, this shifter 142 may be controlled by the $2^{nd}$ bit of the 6-bit shift amount signal 114.

In the illustrated embodiment, the monolithic shifter 102 may include sixteen 2-bit sized shifters 141 that are each configured to shift the data 112 by 2-bits. In such an embodiment, this shifter 141 may be controlled by the $1^{st}$ bit of the 6-bit shift amount signal 114.

In the illustrated embodiment, the monolithic shifter 102 may include sixteen 1-bit sized shifters 140 that are each configured to shift the data 112 by 1-bit. In such an embodiment, this shifter 140 may be controlled by the $0^{th}$ bit of the 6-bit shift amount signal 114.

In various embodiments, once the data 112 has been shifted according to the shift amount signal 114, a shifted data 132 is produced.

As described above, each byte may be shifted a different amount. However, every byte within a shifting group (e.g., a word, etc.) may be required to be shifted the same amount. In the illustrated embodiment, the monolithic shifter 102 may take advantage of that variable uniformity to reduce hardware duplication.

For example, byte 15 (B15), byte 14 (B14), byte 13 (B13), & byte 12 (B12) may be shifted on the word level or boundary. Byte 11 (B11), byte 10 (B10), byte 9 (B09), & byte 8 (B08) may be shifted on the half-word level or boundary (grouped as B11 & B10, and B09 & B08).

In such an embodiment, the $5^{th}$ bit of the shift amount signal 114 (indicating a shift of 32 spaces) for all eight bytes would be 0. In this embodiment, a data portion may not be shifted more than one less than its own number of bits. For example, a 32-bit word may be shifted at most 31 spaces. Therefore, the shifter 145 may be employed to shift all or none of bytes 15-8 (B15-B08). Bytes 7-0 (B07-B00) will be ignored for this example.

However, the $4^{th}$ bit of the shift amount signal 114 may differ for the eight bytes (B15-B08). As bytes 15-12 (B15-B12) are grouped together such that a bit shift of 16 spaces is possible. Therefore, the $4^{th}$ byte of bytes 15-12 (B15-B12) may be one or zero. However, as bytes 11-8 (B11-B08) are grouped separately such that a bit shift of 16 spaces is not possible, the $4^{th}$ bit of bytes 11-8 (B11-08) will all be zero. In the illustrated embodiment, two versions of the shifter 144 are employed, one for each possible data portion.

The $3^{rd}$ bit indicates a bit shift of 8 spaces, which is possible for portions greater than a byte. Again, the $3^{rd}$ bit of the shift amount signal 114 might differ for the eight bytes (B15-B08) if they were grouped as half-words or greater. However, in this example embodiment, the $3^{rd}$ bit for bytes 15-12 (B15-B12) may be one or zero, and of $3^{rd}$ bit for bytes 11-8 (B11-B08) will all be zero. In the illustrated embodiment, four versions of the shifter 143 are employed, one for each possible half-word.

Finally, the $2^{nd}$-$0^{th}$ bits of the shift amount signal 114 may differ for the eight bytes (B15-B08). These bits indicate amounts of shift that are possible for portions that are byte sized. In this example embodiment, the $2^{nd}$-$0^{th}$ bits for bytes 15-12 (B15-B12) may jointly be one or zero. However, now that the byte-level has been reached the $2^{nd}$-$0^{th}$ bits for bytes 11-8 (B11-08) may individually be one or zero.

In the illustrated embodiment, eight versions of the shifters 142, 141, and 140 are employed, one for each possible byte. In the illustrated embodiment, one the smallest portion size (e.g., byte) for the monolithic shifter 102 is reached, the number of shifters no longer double for each successive bit of the shift amount signal 114.

In the illustrated embodiment, while the larger data 112 may be divided into groupings or portions of various sizes (e.g., bytes, half-words, words, etc.), the data portions must be aligned to the traditional size boundaries of the data 112. For example, a half-word may not be carved from bytes 1 and 2 (B01 & B02) as those two bytes straddle where a half-word boundary would be if the data 112 was uniformly partitioned into half-words (e.g., B00 & B01, B02 & B03, etc.). In other embodiments, a more arbitrary data partitioning scheme may be employed. It is understood that the above are merely a few illustrative examples to which the disclosed subject matter is not limited.

In the illustrated embodiment, the mask generator 104 may generate a mask 134 (as described below) for each byte (e.g., B15, B14, etc.). In such an embodiment, the mask shifter 106 may shift each mask 134 according to the shift amount signal 114 corresponding to the byte associated with the mask 134. In the illustrated embodiment, this may result in sixteen shifted masks 136. As described above, the masking circuit 108 may then combine each byte of the shifted data 132 and the byte's respective shifted mask 136 to form the unpolluted shifted data 138.

Figure 3:
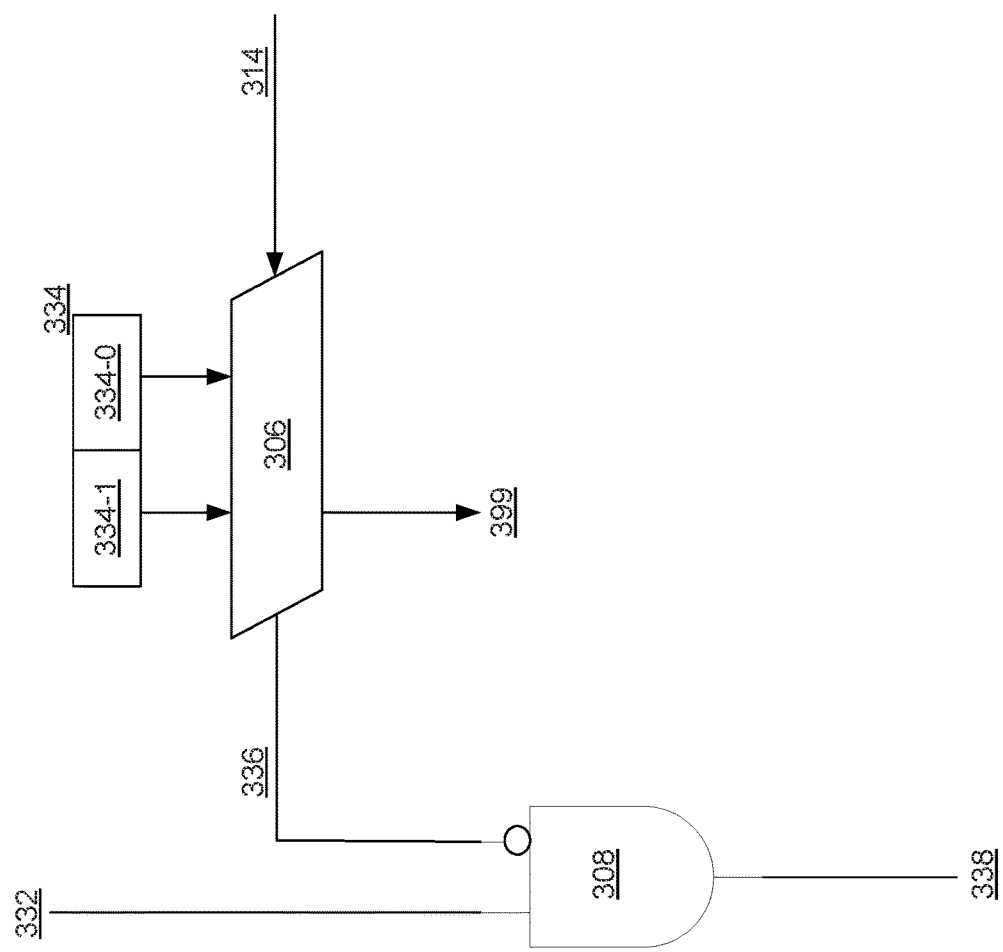
FIG. 3 is a block diagram of an example embodiment of a system in accordance with the disclosed subject matter.

FIG. 3 is a block diagram of an example embodiment of a system 300 in accordance with the disclosed subject matter. In the illustrated embodiment, the process of generating the mask 334 and combining it with the shifted bits 332 is shown in more detail. Further detailed descriptions of the mask process are discussed in relation to FIGS. 4, 5, and 6, below.

In the illustrated embodiment, a mask generator may generate a mask 334 for each byte of data. In various embodiments, the mask 334 may include a plurality of bytes of mask data. In the illustrated embodiment, the mask 334 may include a lower-order mask 334-0 and a higher order mask 334-1. In such an embodiment, the higher-order mask 334-1 may indicate whether or not the amount of shifting is so great that all of the bits of the current byte will be shifted out. The lower-order mask 334-0 may indicate whether or not data or bits from a neighboring byte will be allowed to shift into the current byte.

In the illustrated embodiment, the system 300 may include a mask shifter 306. The mask shifter 306 may receive the mask 334 and shift it according to the shift amount signal 314. In some embodiments, only a portion of the shift amount signal 314 may be used by the mask shifter 306. For example, only the three least significant bits (LSBs) of the shift amount signal 314 (shift[2:0]) may be used by the mask shifter 306. In such an embodiment, whether or not a greater amount of shift has occurred to the associated byte of data may be accounted for by the mask 334.

The mask shifter 306 may be configured to shift the mask 334 within a one byte window. In various embodiments, the window may be centered on the higher-order mask 334-1 and, as shifting occurs, bits from the higher-order mask 334-1 may be shifted out of that window, and bits from the lower-order mask 334-0 may be shifted into the window. In another embodiment that involves shifting bits to the right, the window may be centered on the lower-order mask 334-0.

In such an embodiment, the 16-bits of the mask 334 may be trimmed or truncated down to an 8-bit shifted mask 336. As described above, this trimming may employ a windowing technique. This can be seen more clearly below, in regarding to FIGS. 4, 5, and 6. In such an embodiment, a number of bits 399 may be discarded from the mask 334.

In the illustrated embodiment, the shifted data 332 and the shifted mask 336 may be combined by a masking circuit 308 to form the shifted and unpolluted data 338. In the illustrated embodiment, the masking circuit 308 may include a series (for each bit) of NOT gates and AND gates. It is understood that the above is merely one illustrative example to which the disclosed subject matter is not limited.

Figure 4:
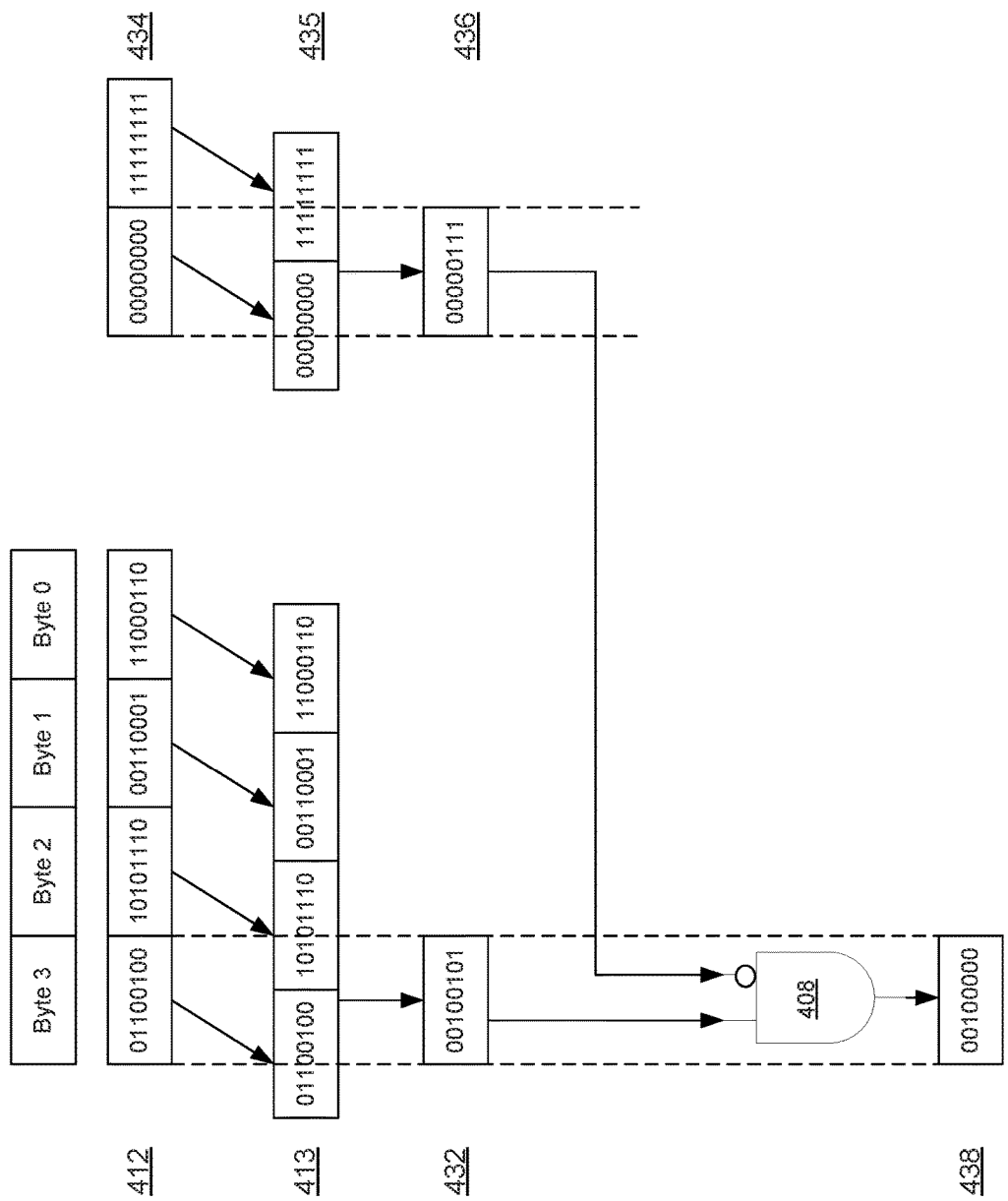
FIG. 4 is a block diagram of an example embodiment of a system in accordance with the disclosed subject matter.

FIG. 4 is a block diagram of an example embodiment of a system 400 in accordance with the disclosed subject matter. FIG. 4 provides an illustrative example of the shifting of one byte of data 412 by a bit-masked variable precision barrel shifter, such as that of FIGS. 1a and 1b. In the illustrated embodiment, the shifting of Byte 3 by 3 leftward bits is shown. It is understood that the system 400 may be shifting other bytes (Byte 0, Byte 1, etc.) by various amounts, but that operation is not discussed so as not to obscure the example.

In the illustrated embodiment, the plurality of input data 412 may include four bytes of data (Byte 3, Byte 2, Byte 1, and Byte 0). The system 400 may be configured to shift the data 412 based upon a byte boundary or level of granularity. It is understood that this level of granularity may be a dynamically changeable input variable or operand to the system 400.

In the illustrated embodiment, the bytes may have unshifted values as follows:
Byte 3: 0b01100100
Byte 2: 0b10101110
Byte 1: 0b00110001
Byte 0: 0b11000110

In the illustrated embodiment, the system 400 may be instructed (e.g., via a element size signal) to shift Byte 3 on a byte-level boundary. For example, in a system 400 with a 2-bit encoded element size signal, the element size signal for Byte 3 may be 0b01.

In the illustrated embodiment, the system 400 may be instructed (e.g., via a shift amount signal) to shift Byte 3 by 3-bits to the left. For example, in a system 400 with a 6-bit shift amount signal, the shift amount signal for Byte 3 may be 0b000011.

For the sake of illustrative simplicity, in the illustrated embodiment, all bytes may be shifted by 3-bits and shifted on the byte-level. It is understood that the above are merely a few illustrative examples to which the disclosed subject matter is not limited.

In the illustrated embodiment, the system 400 may shift the data 412 by 3-bits to form the intermediate shifted data 413. This intermediate shifted data 413 may then be trimmed or truncated, via a windowing technique, to the shifted Byte 3 data 432. In the illustrated embodiment, this raw shifted Byte data 432 may equal 0b00100101. In the illustrated embodiment, 3-bits of data from Byte 2 have polluted or undesirably shifted into the shifted Byte 3 data 432.

In addition, the system 400 may be configured to generate a mask 434 to prevent, correct, or ameliorate the pollution of the shifted data 432 by neighboring bytes of data 412 (e.g., Byte 2). In various embodiments, the mask 434 may include a lower-order portion and a higher-order portion.

In various embodiments, the value of a particular byte's mask 434 may be computed via two equations, a first for the lower-order portion and a second for the higher-order portion. In various embodiments, the mask associated with each byte (e.g., Byte 2, Byte 1, etc.) may differ. In some embodiments, the equation may depend upon or take into account the particular associated byte (e.g., Byte 3, Byte 2, etc.), the amount of desired shift to occur to the byte (e.g., shift 3-bits to the left, etc.), and/or the size or level or granularity of the shift (e.g., byte-level, word-level, etc.).

In the illustrated embodiment, the equations employed to compute the mask 434 may include:
Byte 3, Higher-Order Mask=(Shift>=32)
Byte 3, Lower-Order Mask=(Shift>=24)|((Shift>=8) & size16)|size8

Or, stated verbally, the higher-order mark for Byte 3 will be a series of 1s if the byte is to be shifted by 32-bits or more, and a series of 0s otherwise. In the illustrated embodiment, the shifting amount is less than 32-bits (3-bits). Therefore, the upper-order mask byte is set to a series of 0s.

In such an embodiment, the lower order mask for Byte 3 will be a series of 1s if the byte is to be shifted by 24-bits or more, or shifted by 8-bits or more and the shifting size or granularity is 16-bits (a half-word), or if the shifting size or granularity is 8-bits (a byte). Otherwise, the lower order mask for Byte 3 will be a series of 0s. In the illustrated embodiment, the shifting size or granularity is 8-bits (or a byte). Therefore, the lower-order mask byte is set to a series of 1s.

In the illustrated embodiment, Byte 3's mask 434 may be:
Higher-Order Mask: 0b00000000
Lower-Order Mask: 0b11111111
the combined Byte 3 Mask 434: 0b00000000 11111111

In the illustrated embodiment, the Byte 3 mask 434 may be shifted leftward by 3-bits to form an intermediate shifted mask 435. As described above, the mask shifter may employ a windowing technique to trim the intermediate shifted mask 435 to a shifted mask 436 having a width or size of 1-byte.

In the illustrated embodiment, this shifted mask 436 may have a value of 0b00000111, as 3-bits of the lower-order mask 434 have been shifted into the windowed portion of the mask.

In the illustrated embodiment, the masking circuit 408 may combine the shifted data 432 with the shifted mask 436. In various embodiments, the masking circuit 408 may AND the shifted data 432 with a NOTed version of the shifted mask 436. It is understood that the above is merely one illustrative example to which the disclosed subject matter is not limited. In such an embodiment, the shifted mask 436 may prevent bits from the neighboring byte (Byte 2) from polluting the current byte (Byte 3).

For example, the is in the shifted mask 436 may prevent the 3 bits (0b101) that shifted into Byte 3 from Byte 2, from being present in the final unpolluted shifted byte of data 438. Instead, 0s may be effectively shifted into the byte (e.g., Byte 3) but without the need to hardwire zero-insertion into the data shifter. In the illustrated embodiment, the unpolluted shifted byte of data 438 may have a value of 0b00100000.

Figure 5:
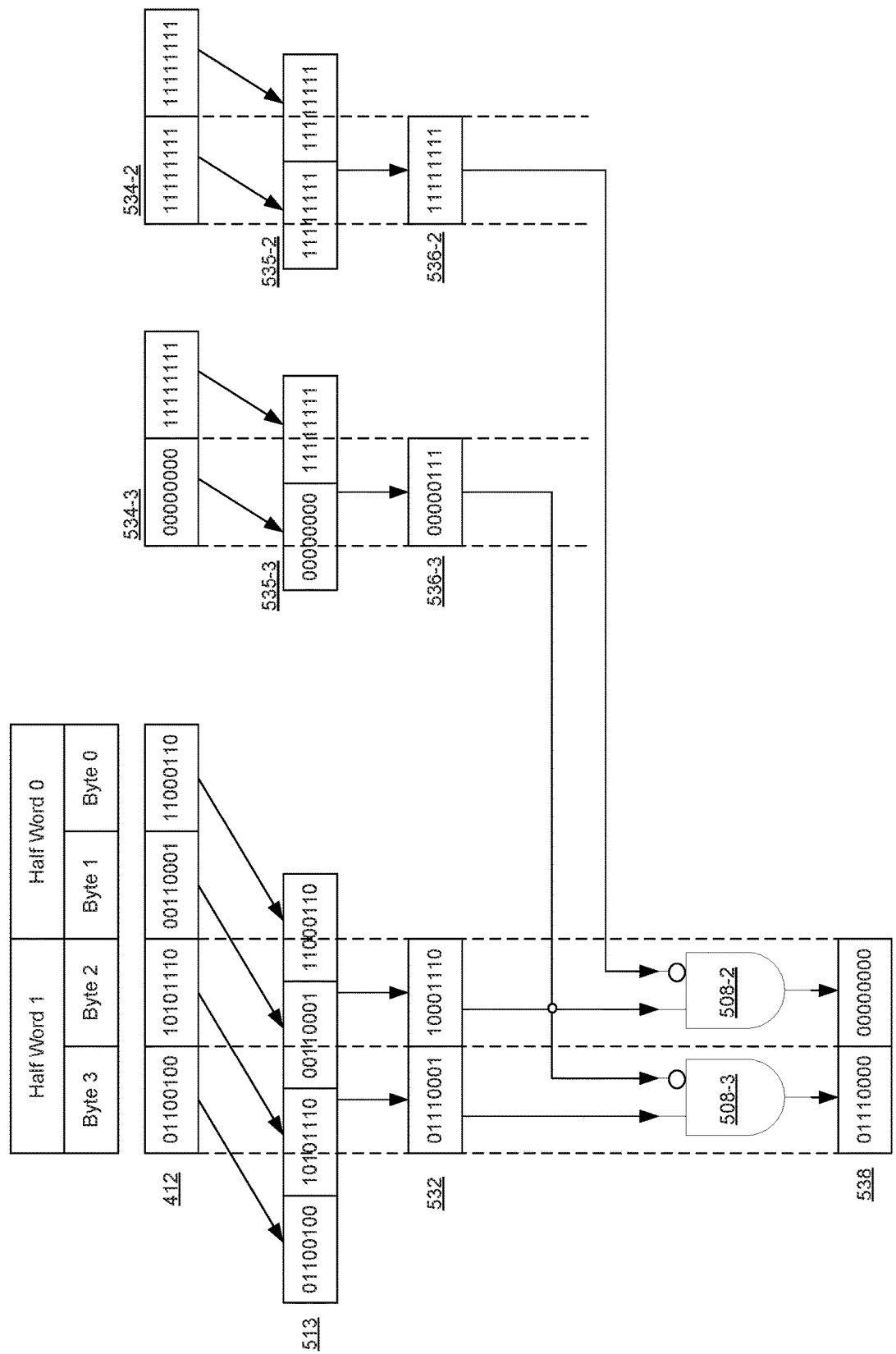
FIG. 5 is a block diagram of an example embodiment of a system in accordance with the disclosed subject matter.

FIG. 5 is a block diagram of an example embodiment of a system 500 in accordance with the disclosed subject matter. FIG. 5 provides an illustrative example of the shifting of two bytes of data 412 by a bit-masked variable precision barrel shifter, such as that of FIGS. 1a and 1b. In the illustrated embodiment, the shifting of Bytes 3 & 2 (grouped as a 16-bit half-word) by 11 leftward bits is shown. It is understood that the system 500 may be shifting other bytes (Byte 0, Byte 1, etc.) by various amounts, but that operation is not discussed so as not to obscure the example.

In the illustrated embodiment, the plurality of input data 412 may include four bytes of data (Byte 3, Byte 2, Byte 1, and Byte 0). The system 500 may be configured to shift the data 412, or at least the portion discussed, based upon a 16-bit or half-word boundary or level of granularity. It is understood that this level of granularity may be a dynamically changeable input variable or operand to the system 500.

In the illustrated embodiment, the bytes may again have an un-shifted value as follows:
Byte 3: 0b01100100
Byte 2: 0b10101110
Byte 1: 0b00110001
Byte 0: 0b11000110

In the illustrated embodiment, the system 500 may be instructed (e.g., via a element size signal) to shift Bytes 3 & 2 together on a 16-bit or half-word-level boundary. For example, in a system 500 with a 2-bit encoded element size signal, the element size signal for Bytes 3 & 2 may be 0b10.

In the illustrated embodiment, the system 500 may be instructed (e.g., via a shift amount signal) to shift Bytes 3 & 2 by 11-bits to the left. For example, in a system 500 with a 6-bit wide shift amount signal, the shift amount signal for Bytes 3 & 2 may be 0b001011.

In the illustrated embodiment, the system 500 may shift the data 412 by 11-bits to form the intermediate shifted data 513. This intermediate shifted data 513 may then be trimmed or truncated, via a windowing technique, to the shifted Bytes 3 & 2 data 532. In the illustrated embodiment, this raw shifted data 532 may equal 0b01110001 10001110. In the illustrated embodiment, 11-bits of data from Bytes 1 & 0 have polluted or undesirably shifted into the shifted Byte 3 & 2 data 532.

In addition, the system 500 may be configured to generate masks 534-3 and 534-2 for Bytes 3 & 2, respectively. In such an embodiment, the masks 534-2 and 534-3 may be configured to allow Byte 2 to shift into Byte 3, but not allow Bytes 1 or 0 to shift into Bytes 3 or 2. Again, in various embodiments, the masks 534-3 and 534-2 may each include a lower-order portion and a higher-order portion.

In the illustrated embodiment, the equations employed to compute the Byte 3 mask 534-3 may again include:
Byte 3, Higher-Order Mask=(Shift>=32)
Byte 3, Lower-Order Mask=(Shift>=24)|((Shift>=8) & size16)|size8

In the illustrated embodiment, Byte 3's mask 534-3 may be:
Higher-Order Mask: 0b00000000
Lower-Order Mask: 0b11111111
the combined Byte 3 Mask 534-3: 0b00000000 11111111

In the illustrated embodiment, the equations employed to compute the Byte 2 mask 534-2 may include:
Byte 2, Higher-Order Mask=(Shift>=24)|((Shift>=8) & size16)
Byte 2, Lower-Order Mask=(Shift>=16)|size16|size8

In the illustrated embodiment, Byte 2's mask 534-2 may be:
Higher-Order Mask: 0b11111111
Lower-Order Mask: 0b11111111
the combined Byte 2 Mask 534-2: 0b11111111 11111111

In the illustrated embodiment, the masks 534-3 and 534-2 may each be shifted leftward by 3-bits (the LSBs of the shift amount signal) to form intermediate shifted masks 535-3 and 535-2. As described above, the mask shifter may employ a windowing technique to trim the intermediate shifted masks 535-3 and 535-2 to a shifted masks 535-3 and 535-2.

In the illustrated embodiment, the shifted mask 536-3 may have a value of 0b00000111, as 3-bits of the lower-order mask 534-3 have been shifted into the windowed portion of the mask. The shifted mask 536-2 may have a value of 0b11111111.

In the illustrated embodiment, the masking circuits 508-3 and 508-2 may combine the shifted data 532 with the shifted masks 536-3 & 536-2. In the illustrated embodiment, the unpolluted shifted half-word of data 538 may have a value of 0b01110000 00000000.

Figure 6:
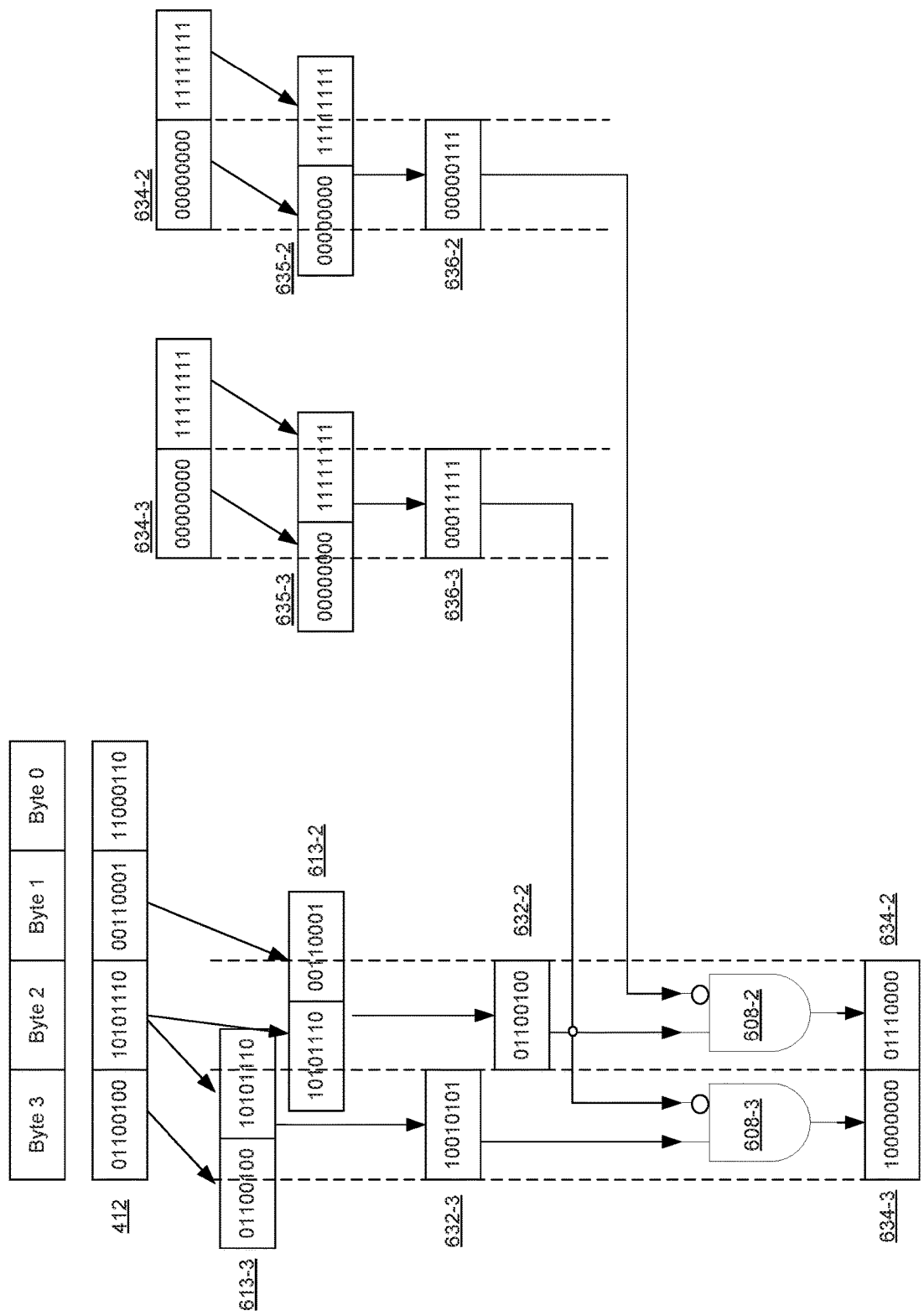
FIG. 6 is a block diagram of an example embodiment of a system in accordance with the disclosed subject matter.

FIG. 6 is a block diagram of an example embodiment of a system 600 in accordance with the disclosed subject matter. FIG. 6 provides an illustrative example of the shifting of two bytes of data 412 by a bit-masked variable precision barrel shifter, such as that of FIGS. 1a and 1b. In the illustrated embodiment, the shifting of Bytes 3 & 2 may occur independently (grouped as 8-bit bytes) by different amounts. It is understood that the system 600 may be shifting other bytes (Byte 0, Byte 1, etc.) by various amounts, but that operation is not discussed so as not to obscure the example.

In the illustrated embodiment, the plurality of input data 412 may include four bytes of data (Byte 3, Byte 2, Byte 1, and Byte 0). The system 600 may be configured to shift the data 412, or at least the portion discussed, based upon an 8-bit or byte boundary or level of granularity. However, unlike the examples above, the two bytes are to be shifted by different amounts. It is understood that this level of granularity may be a dynamically changeable input variable or operand to the system 600.

In the illustrated embodiment, the bytes may again have an un-shifted value as follows:
Byte 3: 0b01100100
Byte 2: 0b10101110
Byte 1: 0b00110001
Byte 0: 0b11000110

In the illustrated embodiment, the system 600 may be instructed (e.g., via a element size signal) to shift Bytes 3 & 2 independently on an 8-bit or byte-level boundary. For example, in a system 600 with a 2-bit encoded element size signal, the element size signal for Bytes 3 & 2 may be 0b01.

In the illustrated embodiment, the system 600 may be instructed (e.g., via two shift amount signals) to shift Byte 3 by 5-bits to the left, and Byte 2 by 3-bits to the left. For example, in a system 600 with a 6-bit wide shift amount signal, the shift amount signal for Byte 3 may be 0b000101 and, for Byte 2, may be 0b000011.

In the illustrated embodiment, the system 600 may shift the Byte 3 related portions of data 412 by 5-bits to form the intermediate shifted data 613-3. This intermediate shifted data 613-3 may then be trimmed or truncated, via a windowing technique, to the shifted Byte 3 data 632-3. In the illustrated embodiment, this raw shifted data 613-3 may equal 0b01110001 10001110, and the trimmed shifted Byte 3 data 632-3 may be 0b10010101. In the illustrated embodiment, 5-bits of data from Byte 2 have polluted or undesirably shifted into the shifted Byte 3 data 632-3.

In the illustrated embodiment, the system 600 may shift the Byte 2 related portions of data 412 by 3-bits to form the intermediate shifted data 613-2. This intermediate shifted data 613-2 may then be trimmed or truncated, via a windowing technique, to the shifted Byte 2 data 632-2. In the illustrated embodiment, this raw shifted data 613-2 may equal 0b10101110 00110001, and the trimmed shifted Byte 2 data 632-2 may be 0b01100100. In the illustrated embodiment, 3-bits of data from Byte 1 have polluted or undesirably shifted into the shifted Byte 2 data 632-2.

In addition, the system 600 may be configured to generate masks 634-3 and 634-2 for Bytes 3 & 2, respectively. In such an embodiment, the masks 634-2 and 634-3 may be configured to not allow bits from any neighboring byte to shift into or pollute a current byte. Again, in various embodiments, the masks 634-3 and 634-2 may each include a lower-order portion and a higher-order portion.

In the illustrated embodiment, the equations employed to compute the Byte 3 mask 634-3 may again include:

Byte 3, Higher-Order Mask=(Shift>=32)

Byte 3, Lower-Order Mask=(Shift>=24)|((Shift>=8) & size16)|size8

In the illustrated embodiment, Byte 3's mask 634-3 may be:

Higher-Order Mask: 0b00000000
Lower-Order Mask: 0b11111111
the combined Byte 3 Mask 634-3: 0b00000000 11111111

In the illustrated embodiment, the equations employed to compute the Byte 2 mask 634-2 may again include:

Byte 2, Higher-Order Mask=(Shift>=24)|((Shift>=8) & size16)

Byte 2, Lower-Order Mask=(Shift>=16)|size16|size8

In the illustrated embodiment, Byte 2's mask 634-2 may be:

Higher-Order Mask: 0b00000000
Lower-Order Mask: 0b11111111
the combined Byte 2 Mask 634-2: 0b0000000011111111

In the illustrated embodiment, the masks 634-3 and 634-2 may each be shifted according to the LSBs of their respective byte's shift amount signals to form intermediate shifted masks 635-3 and 635-2. As described above, the mask shifter may employ a windowing technique to trim the intermediate shifted masks 635-3 and 635-2 to a shifted masks 635-3 and 635-2.

In the illustrated embodiment, the shifted mask 636-3 may have a value of 0b00011111, as 5-bits of the lower-order mask 634-3 have been shifted into the windowed portion of the mask. The shifted mask 636-2 may have a value of 0b00000111, as 3-bits of the lower-order mask 634-2 have been shifted into the windowed portion of the mask.

In the illustrated embodiment, the masking circuits 608-3 and 608-2 may combine the shifted data 632-3 with the shifted mask 636-3, and the shifted data 632-2 with the shifted mask 636-2. In the illustrated embodiment, the unpolluted shifted Byte 3 of data 638-3 may have a value of 0b10000000, and the unpolluted shifted Byte 2 of data 638-2 may have a value of 0b01110000.

In the illustrated embodiments, versions of the mask equations for Bytes 3 and 2 have been shown. In some embodiments, an eight byte system may be employed. In such an embodiment, the equations for the various bytes may be as follows:

Byte 7, Higher-Order Mask=(Shift>=size)

Byte 7, Lower-Order Mask=(Shift>=48)|((Shift>=16) & size32)|(size<=16)

Byte 6, Higher-Order Mask=(Shift>=56)|((Shift>=24) & size32)|((Shift>=8) & (size<=16)

Byte 6, Lower-Order Mask=(Shift>=48)|((Shift>=16) & size32)|(size<=16)

Byte 5, Higher-Order Mask=(Shift>=48)|((Shift>=16) & (size<=32)

Byte 5, Lower-Order Mask=(Shift>=40)|((Shift>=8) & (size<=32)

Byte 4, Higher-Order Mask=(Shift>=40)|((Shift>=8) & (size<=32)

Byte 4, Lower-Order Mask=(Shift>=32)|(size<=32)

Byte 3, Higher-Order Mask=(Shift>=32)

Byte 3, Lower-Order Mask=(Shift>=24)|((Shift>=8) & size16)|size8

Byte 2, Higher-Order Mask=(Shift>=24)|((Shift>=8) & size16)

Byte 2, Lower-Order Mask=(Shift>=16)|size16|size8

Byte 1, Higher-Order Mask=(Shift>=16)

Byte 1, Lower-Order Mask=(Shift>=8)|size8

Byte 0, Higher-Order Mask=(Shift>=8)

Byte 0, Lower-Order Mask=1

It is understood that the above are merely a few illustrative examples to which the disclosed subject matter is not limited.

Figure 7:
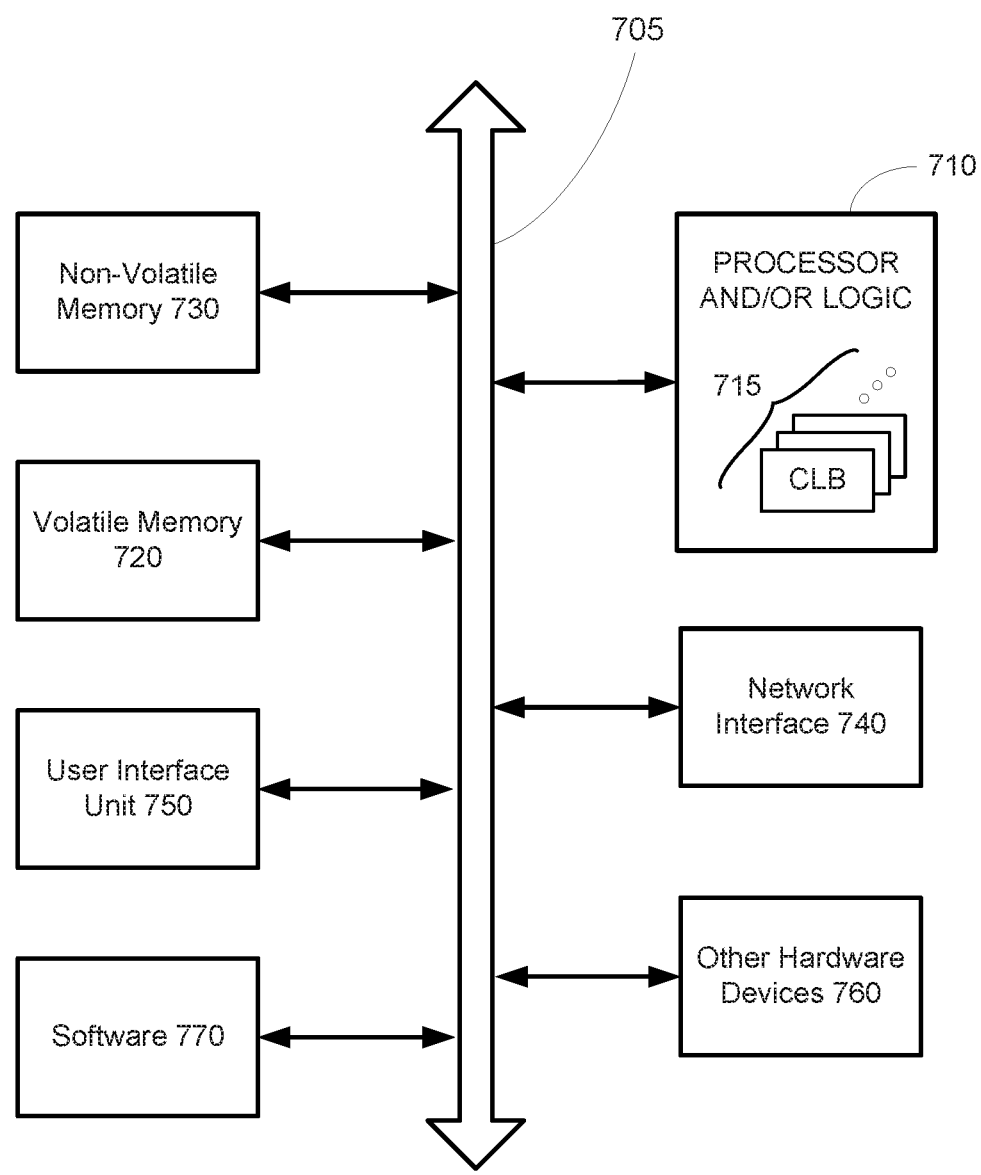
FIG. 7 is a schematic block diagram of an information processing system that may include devices formed according to principles of the disclosed subject matter.

FIG. 7 is a schematic block diagram of an information processing system 700, which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 700 may be used by a user (not shown).

The information processing system 700 according to the disclosed subject matter may further include a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM), etc.). The information processing system 700 according to the disclosed subject matter may further include a non-volatile memory 730 (e.g., a hard drive, an optical memory, a NAND or Flash memory, etc.). In some embodiments, either the volatile memory 720, the non-volatile memory 730, or a combination or portions thereof may be referred to as a "storage medium". In various embodiments, the volatile memory 720 and/or the non-volatile memory 730 may be configured to store data in a semi-permanent or substantially permanent form.

In various embodiments, the information processing system 700 may include one or more network interfaces 740 configured to allow the information processing system 700 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 700 according to the disclosed subject matter may further include a user interface unit 750 (e.g., a display adapter, a haptic interface, a human interface device, etc.). In various embodiments, this user interface unit 750 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 700 may include one or more other devices or hardware components 760 (e.g., a display or monitor, a keyboard, a mouse, a camera, a fingerprint reader, a video processor, etc.). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data inputted from outside of the non-volatile memory 730 may be stored in either the non-volatile memory 730 or the volatile memory 720.

In various embodiments, the information processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740, etc.) of the information processing system 700. In such an embodiment, the information processing system 700 may include one or more native applications, which may be installed locally (e.g., within the non-volatile memory 730, etc.) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 710.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a monolithic shifter configured to:
receive, as input, a plurality of bytes of data,
receive for each byte of data, as a dynamically adjustable input, a number of bits to shift the respective byte of data, and
shift, in parallel, each byte of data by the respective number of bits to create a shifted byte of data;
a mask generator configured to compute a mask for each byte of data, wherein each mask indicates which bits, if any, are to be prevented from being polluted by a neighboring shifted byte of data, and wherein each mask is computed based upon at least one respective mask equation associated with a position of the respective byte of data;
a mask shifter configured to, for each mask, create a shifted mask by shifting each mask according to the number of bits associated with each mask's respective byte of data; and
a masking circuit configured to, for each shifted byte of data, combine the shifted byte of data with a respective shifted mask to create an unpolluted shifted byte of data.

2. The apparatus of claim 1, wherein the mask generator is configured to, for each byte of data, compute a mask that includes a width of multiple-bytes; and
wherein the mask shifter is configured to, for each mask, trim the shifted mask to a width of one-byte that is aligned with the respective byte of data.

3. The apparatus of claim 1, wherein the mask generator is configured to:
receive a grouping indicator that indicates that multiple bytes of data are to be conceptually shifted together; and
compute a mask for each byte of data, wherein each mask indicates that,
if the respective byte of data and a neighboring byte of data are included in the same multiple bytes of data, that bits of the neighboring shifted byte of data may be included in the unpolluted shifted byte of data, and
if the respective byte of data and the neighboring byte of data are not included in the same multiple bytes of data, that bits of the neighboring shifted byte of data may not be included in the unpolluted shifted byte of data.

4. The apparatus of claim 3, wherein the grouping indicator is a dynamically adjustable input that may have a value selected from a group consisting essentially of: byte, half-word, word, and double word.

5. The apparatus of claim 3, wherein the multiple bytes of data that are to be conceptually shifted together are all associated with a same number of bits to shift each respective byte of data of the multiple bytes.

6. The apparatus of claim 3, wherein a first portion of the plurality of bytes of data is associated with a first grouping indicator of a first size and a first same number of bits to shift each respective byte of data of the first portion of the plurality of bytes of data, and
a second portion of the plurality of bytes of data is associated with a second grouping indicator of a second size and a second same number of bits to shift each respective byte of data of the second portion of the plurality of bytes of data.

7. The apparatus of claim 1, wherein the respective mask equation includes at least one operand associated with the number of bits to shift the respective byte of data, and
wherein a portion of the mask equations each include at least one operand associated with a number of bytes of data that are to be conceptually shifted together.

8. The apparatus of claim 1, wherein each mask includes a respective lower-order mask and a respective higher-order mask; and
wherein, for each mask, the lower-order mask is computed based upon a lower-order mask equation, and
wherein, for each mask, the higher-order mask is computed based upon a higher-order mask equation.

9. A method comprising:
receiving a plurality of portions of data, and, for each portion of data, an amount to shift the respective portion of data, wherein the amount to shift a respective portion of data need not be the same as an amount to shift any other portion of data;
shifting, in parallel, each portion of data by the amount to shift of the respective portion of data;
generating, for each portion of data, a mask configured to prevent the respective portion of data from being undesirably polluted by a neighboring portion of data, and wherein generating each mask is based upon at least one respective mask equation associated with a position of the respective portion of data; and
combining, for each portion of data, the respective shifted portion of data and the respective mask, wherein generating each mask includes:
computing an unshifted mask that includes a width greater than a width the mask;
shifting the unshifted mask, by at least a portion of the amount to shift of the respective portion of data, to form a shifted mask; and
trimming the shifted mask to the width of the mask.

10. The method of claim 9, wherein the portions of data are not a same size.

11. The method of claim 9, wherein the respective mask equation includes at least one operand associated with the amount to shift the respective portion of data, and
wherein a portion of the mask equations each include at least one operand associated with a number of bytes of data that are to be conceptually shifted together.

12. The method of claim 9, wherein generating each mask includes:
generating a lower-order mask based upon a lower-order mask equation, and generating higher-order mask based upon a higher-order mask equation.

13. The method of claim 9, wherein receiving comprises:
wherein a first part of the plurality of portions of data is associated with a first grouping indicator of a first size and a first amount to shift each respective portion of data of the first part, and
a second part of the plurality of portions of data is associated with a second grouping indicator of a second size and a second amount to shift each respective portion of data of the second part.

14. The method of claim 9, wherein receiving includes receiving a grouping indicator that is a dynamically adjustable input that indicates how the plurality of portions of data is divided into portions; and
wherein the grouping indicator includes, for each portion, a value selected from a group consisting essentially of: byte, half-word, word, and double word.

15. A system-on-a-chip (SoC) comprising:
an instruction unit configured to issue an instruction comprising:
an indication of a plurality of portions of data to shift, and
a shift amount value that indicates, for each portion of data a number of bits to shift the respective portion of data, wherein the number of bits to shift a portion of data need not be the same as for any other portion of data;
a cache configured to store a plurality of portions of data; and
an execution unit comprising:
a monolithic shifter configured to shift, in parallel, each portion of data by the respective number of bits of shift to create a shifted portion of data,
a mask generator configured to compute a mask for each portion of data, wherein each mask indicates which bits, if any, are to be prevented from being polluted by a neighboring shifted portion of data, and wherein each mask is computed based upon at least one respective mask equation associated with a position of the respective portion of data;
a mask shifter configured to, for each mask, create a shifted mask by shifting each mask according to the number of bits associated with each mask's respective byte of data, and
a masking circuit configured to, for each shifted portion of data, combine the shifted portion of data with a respective shifted mask to create an unpolluted shifted portion of data.

16. The system-on-a-chip of claim 15, wherein the mask generator is configured to:
receive a grouping indicator that indicates that multiple portions of data are to be conceptually shifted together; and
compute a mask for each portion of data, wherein each mask indicates that,
if the respective portion of data and a neighboring portion of data are included in the same multiple portions of data, that bits of the neighboring shifted portion of data may be included in the unpolluted shifted portion of data, and
if the respective portion of data and the neighboring portion of data are not included in the same multiple portions of data, that bits of the neighboring shifted portion of data may not be included in the unpolluted shifted portion of data.

17. The system-on-a-chip of claim 15, wherein a first part of the plurality of portions of data is associated with a first grouping indicator of a first size and a first same number of bits to shift each respective portion of data of the first part, and
a second part of the plurality of portions of data is associated with a second grouping indicator of a second size and a second same number of bits to shift each respective portion of data of the second part.

18. The system-on-a-chip of claim 15, wherein the respective mask equation includes at least one operand associated with the number of bits to shift the respective portion of data, and
wherein a portion of the mask equations each include at least one operand associated with a number of portions of data that are to be conceptually shifted together.

19. The system-on-a-chip of claim 15, wherein each mask includes a respective lower-order mask and a respective higher-order mask; and
wherein, for each mask, the lower-order mask is computed based upon a lower-order mask equation, and
wherein, for each mask, the higher-order mask is computed based upon a higher-order mask equation.

20. The system-on-a-chip of claim 15, wherein each mask indicates that,
if the respective portion of data and a neighboring portion of data are included in the same multiple portions of data, that bits of the neighboring shifted portion of data may be included in the unpolluted shifted portion of data, and
if the respective portion of data and the neighboring portion of data are not included in the same multiple portions of data, that bits of the neighboring shifted portion of data may not be included in the unpolluted shifted portion of data.

* * * * *